United States Patent [19]

Yasuno et al.

[11] Patent Number: 4,974,163
[45] Date of Patent: Nov. 27, 1990

[54] ANTI-SKID BRAKE CONTROL SYSTEM WITH DERIVATION OF PRECISE PROJECTED VEHICLE BODY SPEED DATA UTILIZING LONGITUDINAL ACCELERATION EXERTED ON THE VEHICLE BODY

[75] Inventors: Yoshiki Yasuno, Kanagawa; Yasuki Ishikawa, Tokyo; Akira Higashimata; Takeshi Fujishiro, both of Kanagawa, all of Japan

[73] Assignee: Nissan Motor Company, Limited, Yokohama, Japan

[21] Appl. No.: 315,651

[22] Filed: Feb. 27, 1989

[30] Foreign Application Priority Data

Feb. 29, 1988 [JP] Japan .................. 63-46692

[51] Int. Cl.$^5$ .............................................. B60T 8/58
[52] U.S. Cl. .................. 364/426.02; 303/97; 303/103
[58] Field of Search ............ 364/426.01, 426.02, 364/565, 566; 303/95, 97, 103, 105, 109, 110; 180/197

[56] References Cited

U.S. PATENT DOCUMENTS

| | | | |
|---|---|---|---|
| 4,089,564 | 5/1978 | Öberg | 303/109 |
| 4,675,819 | 6/1987 | Fennel | 364/426.02 |
| 4,774,668 | 9/1988 | Matsubara et al. | 303/109 |
| 4,787,682 | 11/1988 | Muto | 364/426.01 |
| 4,802,711 | 2/1989 | Muto et al. | 303/109 |
| 4,807,941 | 2/1989 | Onogi et al. | 303/109 |
| 4,818,037 | 4/1989 | McEnnan | 303/109 |

Primary Examiner—Gary Chin
Attorney, Agent, or Firm—Foley & Lardner, Schwartz, Jeffery, Schwaab, Mack, Blumenthal & Evans

[57] ABSTRACT

An anti-skid brake control system comprises a limiter which provides an upper limit of variation of wheel speed indicative data. The limited wheel speed indicative data is derived with respect to each wheel. The greatest limited wheel speed indicative data is selected as vehicle body speed indicative initial data. The anti-skid brake control system derives a projected vehicle body speed indicative data by adding an integrated value of a longitudinal acceleration to the aforementioned vehicle body speed indicative initial data. The integrated value is provided with a predetermined offset value for compensating for error caused in a longitudinal acceleration sensor.

14 Claims, 6 Drawing Sheets

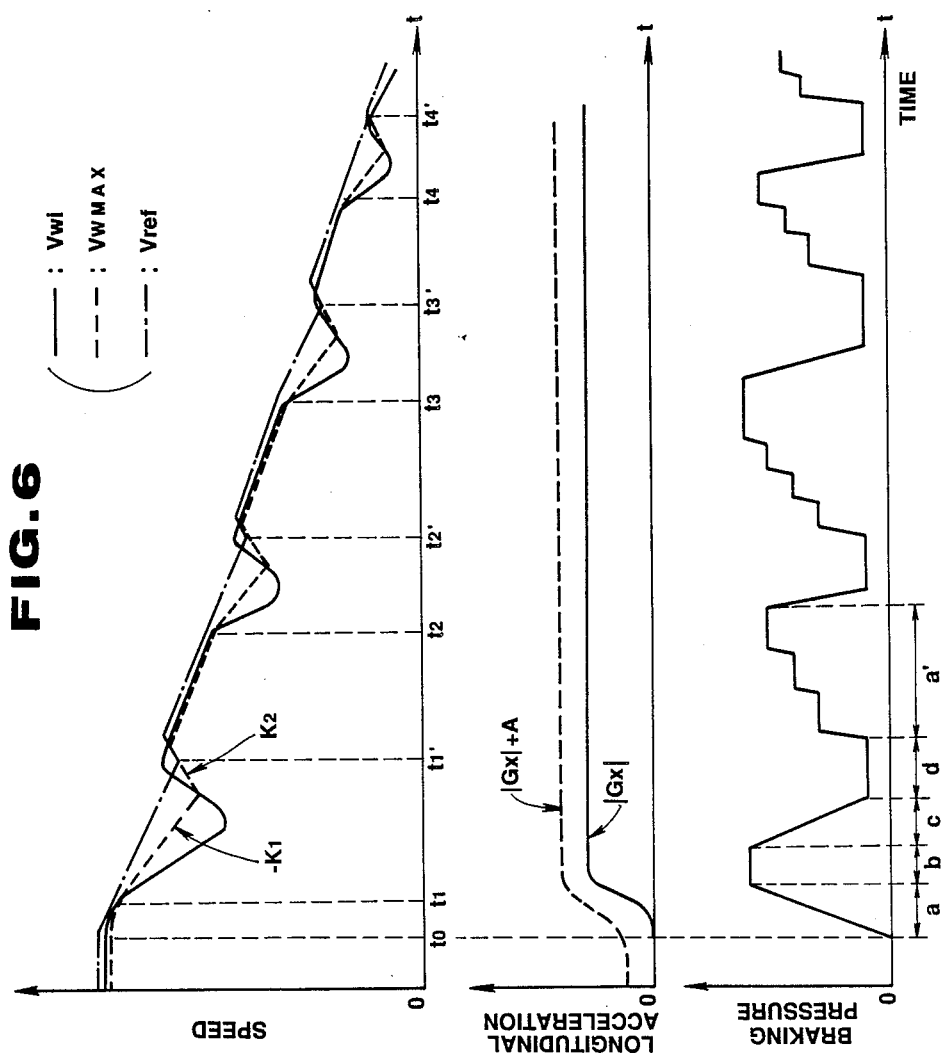

ANTI-SKID BRAKE CONTROL SYSTEM WITH DERIVATION OF PRECISE PROJECTED VEHICLE BODY SPEED DATA UTILIZING LONGITUDINAL ACCELERATION EXERTED ON THE VEHICLE BODY

BACKGROUND OF THE INVENTION

1. Field of the Invention

The present invention relates generally to an anti-skid brake control system for preventing vehicular wheels from skidding during braking operation and thereby optimise vehicular efficiency and maintain satisfactory stability. More specifically, the invention relates to a novel technology for deriving a vehicular body speed data for performing anti-skid brake control depending upon wheel slippage.

2. Description of Background Art

It is known that the vehicular brake performance becomes optimum when wheel slippage is maintained 10 to 20%. In order to maintain the wheel slippage in the aforementioned optimum range, braking pressure is adjusted over one or more skid control cycles for cyclically increasing and decreasing braking pressure for decelerating a rotation speed of a vehicular wheel. In general, a skid control cycle is controlled based on wheel slippage and wheel acceleration. The wheel acceleration can be derived on the basis of wheel speed. On the other hand, wheel slippage is generally derived on the basis of the wheel speed and a vehicle speed. Therefore, in order to precisely control the skid control cycle, it is essential to determine the vehicle speed.

In the anti-skid brake control technology, it is usual to derive the vehicle speed data on the basis of wheel speed. In the alternative, vehicle speed data is derived based on a longitudinal acceleration exerted on the vehicular body. In the later case, vehicle speed data can be derived by subtracting integrated value of the longitudinal acceleration from an initial wheel speed upon initiation of braking operation. Such an anti-skid brake control technology has been disclosed in Japanese Patent First (unexamined) Publication (Tokkai) Showa No. 57-11149.

In such an conventional anti-skid brake control system, the vehicle body speed data is derived based on a wheel speed latched during variation of wheel speed toward locking and an integrated longitudinal acceleration value is integrated from the latching timing of said wheel speed. When integration of the longitudinal acceleration extends for a relatively long period, errors contained in a longitudinal acceleration indicative signal due to secular variation of gain of a longitudinal acceleration sensor, DC offset of the longitudinal acceleration sensor and so forth, or due to vehicular driving conditions such as a hill climbing state, influences controlling the skid control cycle. The influence of the error contained in the longitudinal acceleration indicative signal will become greater as the integration period is expanded.

The influence of the error in the longitudinal acceleration indicative signal will thus degrade accuracy or precision of brake control.

SUMMARY OF THE INVENTION

Therefore, it is an object of the present invention to provide an anti-skid brake control system which can provide satisfactorily high precision in projecting vehicle body speed data.

Another object of the invention is to provide an anti-skid brake control system which can minimize influence of errors in monitoring a longitudinal acceleration.

In order to accomplish aforementioned and other objects, an anti-skid brake control system, according to the present invention, comprises a limiter which provides an upper limit of variation of wheel speed indicative data. The limited wheel speed indicative data is derived with respect to each wheel. One of the greatest limited wheel speed indicative data is selected as vehicle body speed indicative initial data. The anti-skid brake control system derives a projected vehicle body speed indicative data by adding an integrated value of a longitudinal acceleration to the aforementioned vehicle body speed indicative initial data. The integrated value is provided with a predetermined offset value for compensating for errors caused in a longitudinal acceleration sensor.

According to one aspect of the invention, an anti-skid brake control system comprises:

a hydraulic circuit connecting a hydraulic pressure source to a wheel cylinder generating a braking pressure therein;

a pressure control valve means disposed in the hydraulic circuit, for operating to increase the braking pressure in the wheel cylinder in a first mode and to decrease the braking pressure in the wheel cylinder in a second mode;

a first sensor means for monitoring a rotation speed of a vehicular wheel to which the wheel cylinder is associated to produce a wheel speed indicative signal;

a second sensor means for monitoring a longitudinal acceleration exerted on a vehicle body for producing a longitudinal acceleration indicative signal;

a first arithmetic means for providing a predetermined offset value to the longitudinal acceleration indicative signal and integrating the offset longitudinal acceleration indicative signal for deriving a wheel speed deceleration magnitude indicative data, and adding the wheel speed deceleration magnitude indicative data and an initial value which corresponds to a wheel speed indicative signal value at the beginning of each skid control cycle for deriving a vehicle body speed representative data; and a second arithmetic means for controlling the pressure control valve means in a first mode for placing the pressure control valve in the first position and in a second mode for placing the pressure control valve means in the second position, the second arithmetic means deriving a control signal for selecting the first and second mode on the basis of the wheel speed indicative signal and the vehicle body speed representative data so as to maintain a wheel slippage within a predetermined range.

According to another aspect of the invention, an anti-skid brake control system comprises:

a hydraulic circuit connecting a hydraulic pressure source to a first and second wheel cylinders generating braking pressures for decelerating first and second vehicular wheels;

first and second pressure control valve means disposed in the hydraulic circuit for controlling braking pressure generated in respectively associated one of first and second wheel cylinders, each of the first and second pressure control valve means operating to increase the braking pressure in the wheel cylinder in a first mode and to decrease the braking pressure in the wheel cylinder in a second mode;

a first sensor means for monitoring a rotation speed of the first vehicular wheel to which the first wheel cylinder is associated to produce a first wheel speed indicative signal;

a second sensor means for monitoring a rotation speed of the second vehicular wheel to which the second wheel cylinder is associated to produce a second wheel speed indicative signal;

a third sensor means for monitoring a longitudinal acceleration exerted on a vehicle body for producing a longitudinal acceleration indicative signal;

a first arithmetic means for providing a predetermined offset value to the longitudinal acceleration indicative signal and integrating the offset longitudinal acceleration indicative signal for deriving a wheel speed deceleration magnitude indicative data, and adding the wheel speed deceleration magnitude indicative data and an initial value which corresponds to the greater one of the first and second wheel speed indicative signal values at the beginning of each skid control cycle for deriving a vehicle body speed representative data; and a second arithmetic means for controlling the pressure control valve means in a first mode for placing the pressure control valve in the first position and in a second mode for placing the pressure control valve means in the second position, the second arithmetic means deriving a control signal for selecting the first and second mode on the basis of the wheel speed indicative signal and the vehicle body speed representative data so as to maintain a wheel slippage within a predetermined range.

According to a further aspect of the invention, an anti-skid brake control system comprises:

a hydraulic circuit connecting a hydraulic pressure source to at least first, second and third wheel cylinders generating braking pressures for decelerating first, second and third vehicular wheels;

at least first, second and third pressure control valve means disposed in the hydraulic circuit for controlling braking pressures generated in respectively associated one of the first, second and third wheel cylinders, each of the first, second and third pressure control valve means operating to increase the braking pressure in the associated one of the first, second and third wheel cylinders in a first mode, to decrease the braking pressure in the wheel cylinder in a second mode and to hold the braking pressure in the wheel cylinder at a constant value in a third mode;

a first sensor means for monitoring a rotation speed of the first vehicular wheel to which the first wheel cylinder is associated to produce a first wheel speed indicative signal;

a second sensor means for monitoring a rotation speed of the second vehicular wheel to which the second wheel cylinder is associated to produce a second wheel speed indicative signal;

a third sensor means for monitoring a rotation speed of the third vehicular wheel to which the third wheel cylinder is associated to produce a third wheel speed indicative signal;

a fourth sensor means for monitoring a longitudinal acceleration exerted on a vehicle body for producing a longitudinal acceleration indicative signal;

a first arithmetic means for providing a predetermined offset value to the longitudinal acceleration indicative signal and integrating the offset longitudinal acceleration indicative signal for deriving a wheel speed deceleration magnitude indicative data, and adding the wheel speed deceleration magnitude indicative data and an initial value which corresponds to one of the first, second and third wheel speed indicative signal values having the greatest value at the beginning of each skid control cycle for deriving a vehicle body speed representative data; and a second arithmetic means for controlling the pressure control valve means in a first mode for placing the pressure control valve in the first position, in a second mode for placing the pressure control valve means in the second position, in a third mode for placing the pressure control valve means to the third position, the second arithmetic means deriving a control signal for selecting the first and second mode on the basis of the wheel speed indicative signal and the vehicle body speed representative data so as to maintain a wheel slippage within a predetermined range.

The first arithmetic means may operate in a normal arithmetic mode for deriving the vehicle body speed representative data using a value corresponding to the one of the first, second and third wheel speed indicative signal values having the greatest value and a skid control state arithmetic mode for deriving the vehicle body speed on the basis of the initial value and the integrated value of the offset longitudinal acceleration indicative value in the skid cycle. The first means may derive a wheel acceleration and compare the wheel acceleration with a predetermined threshold value so as to select the normal arithmetic mode when the wheel acceleration is maintained greater than or equal to the threshold value and to select the skid control state arithmetic mode otherwise. The first means may further compare the vehicle body speed representative data and the wheel speed indicative signal value so as to permit the normal arithmetic mode operation when the wheel speed indicative signal value is greater than or equal to the vehicle body speed representative data.

In the practice, the second arithmetic means derives a wheel acceleration with respect to each of the first, second and third wheel speed indicative signals and a wheel slippage on the basis of the vehicle body speed representative data and each of the first, second and third wheel speed indicative signals, the second arithmetic means derives an anti-skid control signal for each of the first, second and third pressure control valves for operating the latter to one of the first, second and third modes, the second means deriving the anti-skid brake control signal to order the third mode in response to wheel acceleration smaller than or equal to a predetermined deceleration threshold, to order the second mode in response the wheel slippage greater than or equal to a predetermined wheel slippage threshold, to order the third mode when wheel acceleration is greater than or equal to a predetermined acceleration threshold, and to order the first mode when wheel slippage is smaller than the wheel slippage threshold and the wheel acceleration is smaller than the wheel acceleration threshold and greater than the wheel deceleration threshold. The second means can perform anti-skid brake control over a skid cycle according to the following sequence; the second means derives the anti-skid brake control signal to order the third mode in response to decreasing of the wheel acceleration across to a predetermined deceleration threshold, to order the second mode in response to increasing of the wheel slippage across a predetermined wheel slippage threshold, to order the third mode in response to increasing of the wheel acceleration across a predetermined acceleration threshold, and to order the first mode in response to decreasing of the wheel slippage across the vehicle body speed representative data.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIG. 6 is a timing chart showing a process of anti-skid control to be performed through the process as shown in FIG. 5.

DESCRIPTION OF THE PREFERRED EMBODIMENT

Figure 1:
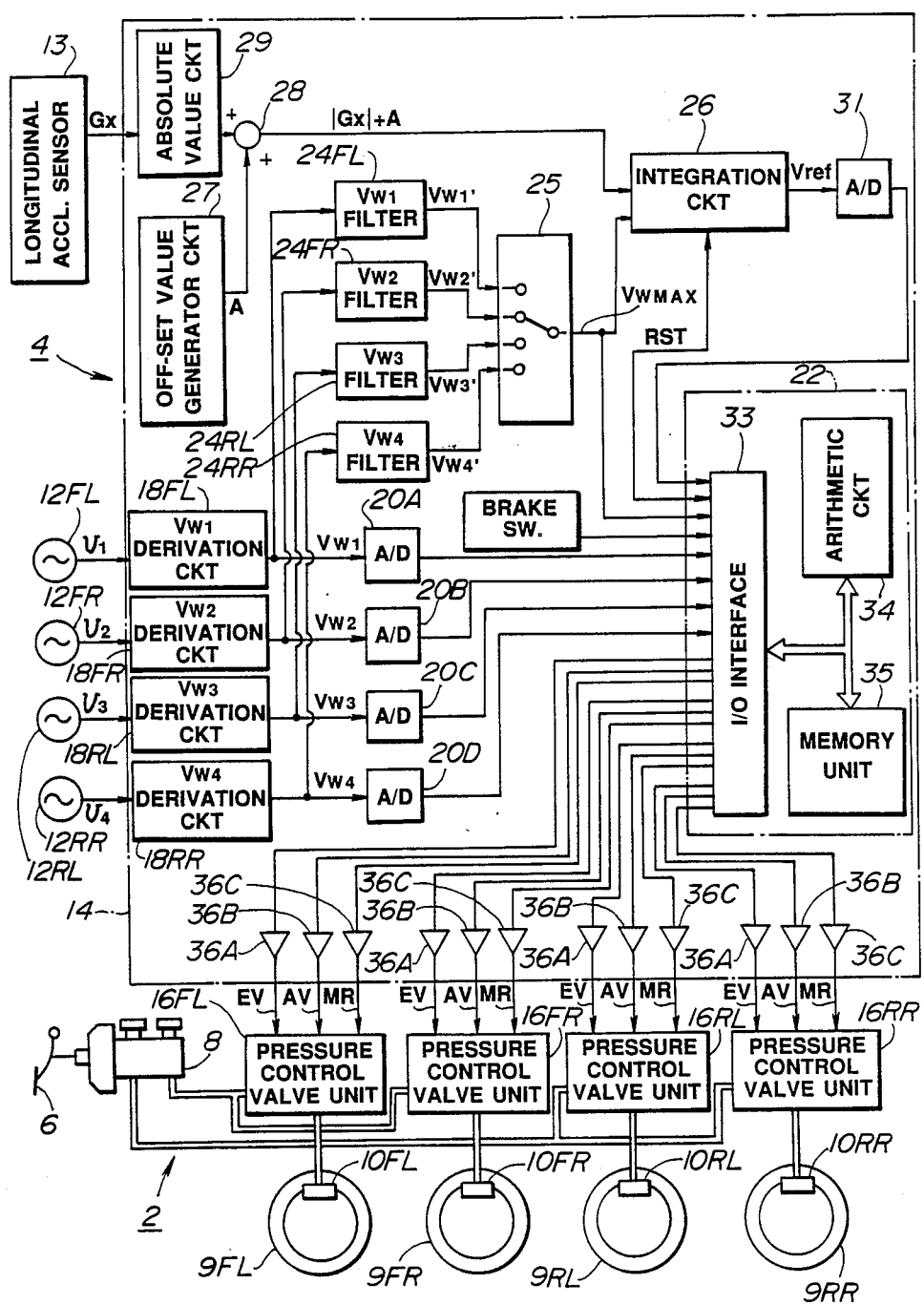
FIG. 1 is a diagram of the preferred embodiment of an anti-skid brake control system according to the present invention.

Referring now to the drawings, particularly to FIG. 1, the preferred embodiment of an anti-skid brake control system, according to the present invention, is applied to a four-wheel drive type automotive vehicle, in which driving torque generated by an automotive engine is distributed to four wheels. A brake system employed in the shown vehicle will be generally represented by the reference numeral 2. The brake system includes a brake pedal 6, a master cylinder 8 mechanically associated with the brake pedal 6 for building up braking pressure in response to manual input of braking force through the brake pedal, and wheel cylinders 10FL, 10FR, 10RL and 10RR of vehicular brakes for applying braking pressure for respective front-left, front-right, rear-left and rear-right wheels 9FL, 9FR, 9RL and 9RR. The anti-skid brake control system includes wheel speed sensors 12FL, 12FL, 12RL and 12RR respectively monitoring rotation speed of front-left, front-right, rear-left and rear-right wheels 9FL, 9FR, 9RL and 9RR to produce wheel speed indicative signals $v_1$, $v_2$, $v_3$ and $v_4$. A longitudinal acceleration sensor 13 is also provided for monitoring longitudinal acceleration exerted on a vehicular body and produces a longitudinal acceleration indicative signal Gx. The wheel speed sensors 12FL, 12FR, 12RL and 12RR and the longitudinal acceleration sensor 13 are connected to a control unit 14. The control unit 14 processes the input wheel speed indicative signals $v_1$, $v_2$, $v_3$ and $v_4$ and the longitudinal acceleration indicative signal Gx to produce anti-skid brake control signals for controlling pressure control valves 16FL, 16FR, 16RL and 16RR, each of which controls braking pressure in the corresponding one of wheel cylinders 10FL, 10FR, 10RL and 10RR.

Each of the wheel speed sensor 12FL, 12FR, 12RL and 12RR comprises a rotor having a plurality of notches on the periphery at a regular interval corresponding a predetermined rotational angle, and an electromagnetic pick-up which forms a proximity switch. The wheel speed sensor thus produces alternating current having a frequency corresponding to the wheel speed. The longitudinal acceleration sensor 13 is provided on an appropriate orientation of the vehicle body to monitor the longitudinal acceleration to produce the longitudinal acceleration indicative signal in analog direct current form. The longitudinal acceleration sensor 13 is designed to produce a positive value longitudinal acceleration indicative signal Gx in response to the backward acceleration or deceleration and to produce a negative value longitudinal acceleration indicative signal -Gx in response to the forward acceleration or acceleration.

The control unit 14 has wheel speed derivation circuits 18FL, 18FR, 18RL and 18RR. Each wheel speed derivation circuit 18FL, 18FR, 18RL and 18RR has a frequency-voltage (F/V) converter for generating a voltage signal representative of the frequency of a corresponding one of the alternating current form wheel speed indicative signals $v_1$, $v_2$, $v_3$ and $v_4$ and thereby represents the wheel speed. The process of derivation of the wheel speed indicative voltage signal has been disclosed in the following United States Patents, all owned by the common assignee to the present invention.

U.S. Pat. No. 4,408,290, issued on Oct. 4, 1983
U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on June 16, 1987
U.S. Pat. No. 4,680,714, issued on July 14, 1987
U.S. Pat. No. 4,682,295, issued on July 21, 1987
U.S. Pat. No. 4,680,713, issued on July 145, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986
U.S. Pat. No. 4,662,686, issued on May 5, 1987
U.S. Pat. No. 4,667,176, issued on May 19, 1987
U.S. Pat. No. 4,597,052, issued on June 24, 1986
U.S. Pat. No. 4,637,663, issued on Jan. 20, 1987
U.S. Pat. No. 4,683,537, issued on July 28, 1987

The disclosures of the above-identified United States Patents will be herein incorporated by reference.

The wheel speed derivation circuits 18FL, 18FR, 18RL and 18RR produce wheel speed indicative voltage signals $Vw_1$, $Vw_2$, $Vw_3$ and $Vw_4$ having a voltage level corresponding to the frequency of the wheel speed indicative signals $v_1$, $v_2$, $v_3$ and $v_4$ and representative of the corresponding wheel speed. The wheel speed derivation circuits 18FL, 18FR, 18RL and 18RR are respectively connected to analog-to-digital (A/D) converters 20A, 20B, 20C and 20D. The A/D converters perform analog-to-digital conversion to produce wheel speed indicative data in digital form. The A/D converters are connected to a microprocessor 22 which comprises an input/output interface 33, an arithmetic circuit 34 and a memory unit 35 to input the wheel speed indicative data $Vw_1$, $Vw_2$, $Vw_3$ and $Vw_4$.

The control unit 14 also has wheel speed filters 24FL, 24FR, 24RL and 24RR. These wheel speed filters 24FL, 24FR, 24RL and 24RR are respectively connected to the wheel speed derivation circuits 18FL, 18FR, 18RL and 18RR to receive therefrom the wheel speed indicative voltage signal $Vw_1$, $Vw_2$, $Vw_3$ and $Vw_4$. The wheel speed filters 24FL, 24FR, 24RL and 24RR serve as digital secondary lag filters. The wheel speed filters 24FL, 24FR, 24RL and 24RR comprise A/D converters at the input side and D/A converters at the output side, and limit the reduction rate of the wheel speed at a predetermined reduction rate $-k_1$. The wheel speed filters 24FL, 24FR, 24RL and 24RR also limit the increasing rate of the wheel speed at a predetermined increasing rate $k_2$. These wheel speed filters 24FR, 24RL and 24RR are designed for removing noise components superimposed on the wheel speed indicative signals $v_1$, $v_2$, $v_3$ and $v_4$, which are created by unevenness of the road surface, an electric spike generated in the electric system, or the like. The wheel speed filters 24FL, 24FR, 24RL and 24RR produce digital form limited wheel speed indicative data $Vw_1'$, $Vw_2'$, $Vw_3'$ and $Vw_4'$ which have modified wheel speed indicative digital values so that the variation rate of the wheel speed indicative data are maintained within the predetermined range defined by the reduction limit $-k_1$ and increasing limit $k_2$.

The output terminals of the wheel speed filters 24FL, 24FR, 24RL and 24RR are connected to a select-HIGH switch 25. The select-HIGH switch 25 selects the one of limited wheel speed indicative data $Vw_1'$, $Vw_2'$, $Vw_3'$ and $Vw_4'$ which has the greatest value amount of the four inputs. The select-HIGH switch 25 thus outputs the selected one of the limited wheel speed indicative data $Vw_1'$, $Vw_2'$, $Vw_3'$ and $Vw_4'$ as a maximum wheel speed data $Vw_{max}$. The select-HIGH switch 25 is connected to an integration circuit 26 and to the input/output interface 33 of the microprocessor 22.

The longitudinal acceleration sensor 13 is connected to an absolute value circuit 29 to produce an absolute value signal indicative of the magnitude of acceleration exerted on the vehicular body. The absolute value circuit 29 is connected to a summing junction 28 to feed the absolute value signal. The summing junction 28 is also connected to an offset value generator circuit 27. The offset value generator circuit 27 is designed for generating an offset value A which is determined for compensating for error contained in the longitudinal acceleration indicative signal Gx, which is caused by secular variation of the longitudinal acceleration sensor 13 or inclination of the road. The offset value generator circuit 27 outputs a positive value offset value A of constant value. Therefore, the output of the summing junction 28 becomes $|Gx| + A$. The output of the summing junction $(|Gx| + A)$ is input to the integration circuit 26.

The integration circuit 26 is connected to the microprocessor 22. The integration circuit 26 is responsive to a HIGH reset signal RST output from the microprocessor 22 to be reset. As long as the reset signal RST is maintained at LOW level, the integration circuit 26 latches the maximum wheel speed data $Vw_{max}$ as an initial value in response to a railing edge of the HIGH level reset signal RST, integrates the output $(|Gx| + A)$ of the summing junction 28, and calculates a sum value of the latched maximum wheel speed data $Vw_{max}$ and the integrated value $\int (|Gx| + A) dt$. The sum value derived in the integration circuit 26 serves as a vehicle body speed representative analog signal $V_{ref}$. The vehicle body speed representative analog signal $V_{ref}$ of the integration circuit 26 is fed to an A/D converter 31. The A/D converter 31 converts the vehicle body speed representative analog signal $V_{ref}$ into a digital form vehicle body speed representative data $V_{ref}$ and inputs the digital vehicle body speed representative data to the input/output interface 33 of the microprocessor 22.

The arithmetic circuit 34 of the microprocessor 22 is designed to execute programs stored in the memory unit 35, the process of which programs will be discussed herebelow with reference to FIGS. 3 to 5. The arithmetic circuit 34 also operates to output anti-skid brake control signals for the pressure control valves 16FL, 16FR, 16RL and 16RR, and the reset signal RST for controlling operation of the integration circuit 26. The output ports for feeding the anti-skid brake control signals are connected to amplifiers 36A, 36B, 36C and 36D. The anti-skid brake control signals for each pressure control valve 16FL, 16FR, 16RL and 16RR, comprises an induction control signal EV (hereafter referred to as "Ev signal"), a drain control signal AV (hereafter referred to as "Av signal") and a drain pump control signal MR (hereafter referred to as "MR signal ⓇⓇ"). The EV, AV and MR signals output from the microprocessor 22 are digital or binary signals representative of control values therefor. The amplifiers 36A, 36B, 36C and 36D are designed to amplify the EV, AV and MR signals and output current signals having levels respectively corresponding to the digital form Ev, Av and MR signals.

Figure 2:
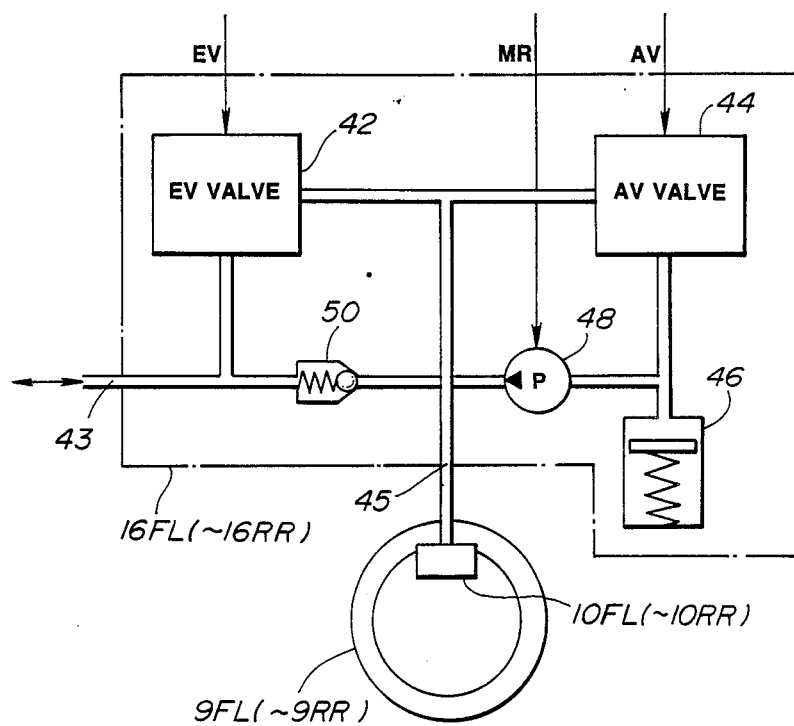
FIG. 2 is a schematic diagram of a pressure control valve employed in the preferred embodiment of the anti-skid brake control system, of FIG. 1.

As shown in FIG. 2, the pressure control valve unit 16, whose reference numeral commonly represents the pressure control valve units 16FL, 16FR, 16RL and 16RR, comprises an induction control valve 42 which will be hereafter referred to as "EV valve", a drain control valve 44, which will be hereafter referred to as "AV signal" and a drain pump 48 and a pressure accumulator 46. The pressure control valve 16 has an inlet port 43 connected to the master cylinder 8 to receive the working fluid pressure built up in the latter and an outlet port 45 connected the wheel cylinder 10. The reference numeral 10 generally represents the wheel cylinders 10FL, 10FR, 10RL and 10RR. The EV valve 42 is interposed between the inlet port 43 and the outlet port 45 for controlling introduction of the pressurized working fluid to the wheel cylinder 10. The Av valve 44 is connected to the outlet of the EV valve 42, the outlet port 45 at the inlet side and to the pressure accumulator 46 and the drain pump 48. The discharge outlet drain pump 48 is connected to the inlet port 43 via a one-way check valve 50 for returning part of the working fluid in the pressure control valve unit 16 to the fluid reservoir (not shown) and designed for supplying pressurized working fluid.

With the construction set forth above, the pressure control valve unit 22 essentially operates in three mutually different operational modes. Name, the pressure control valve unit 22 operates in an APPLICATION mode for increasing braking pressure in the wheel cylinder 10, a RELEASE mode for decreasing braking pressure in the wheel cylinder, and a HOLD mode to maintain the braking pressure constant. In the APPLICATION mode position, the EV valve 42 is maintained in open position to establish fluid communication between the master cylinder 8 and the wheel cylinder 10 and the AV valve 44 is maintained in a closed position for blocking fluid communication between the wheel cylinder 10 and the pressure accumulator 46. At the same time, the drain pump 48 may be held in the inoperative state.

In the RELEASE mode position of the pressure control valve unit 16, the EV valve 42 is held closed to block fluid communication between the inlet port to the outlet port and thereby block pressure supply from the master cylinder 8 to the wheel cylinder 10. At the same time, the AV valve 44 is maintained at an open position to establish fluid communication between the outlet port 45, and the pressure accumulator 46 and the drain pump 48 so that the pressurized fluid in the wheel cylinder 10 can be drained to the pressure accumulator 46 or to the fluid reservoir via the drain pump 48 and the one-way check valve 50. In order to drain part of the working fluid from the wheel cylinder to the fluid reservoir, the drain pump 48 is driven in this RELEASE mode. On the other hand, in the HOLD mode position, both of the EV valve 42 and the AV valve 44 are held closed for completely disconnecting the wheel cylinder 10 from the inlet port 43 and the pressure accumulator 46.

The EV valve 42 is held open in response to LOW level EV signal and is shifted to a closed position in response to the HIGH level EV signal. On the other hand, the AV valve 44 is maintained at the closed position as long as the AV signal is held at LOW level and is opened by the HIGH level AV signal. The drain pump 48 is driven by the HIGH level MR signal.

The pressure control valve unit 16 is operated in the aforementioned three mode positions over skid control cycles. In general, a skid control cycle is scheduled as follows:

(1) the pressure control valve unit 16 is maintained at the APPLICATION mode position upon initiation of the braking operation which is triggered by depression of the brake pedal 6, (2) by application of the braking force to the brake pedal, working fluid pressure is built up in the master cylinder 8, since the pressure control valve unit 16 is held at the APPLICATION mode position, the braking pressure in the wheel cylinder 10 is increased linearly in proportion to increasing of the working fluid pressure to decelerate the wheel speed., (3) by increasing of the braking pressure, wheel deceleration $-\alpha$ (negative value of wheel acceleration) increases and becomes greater than a predetermined deceleration threshold $-\alpha_{ref}$, the control unit 22 is responsive to the wheel deceleration increased across the deceleration threshold to initiate a skid control cycle, upon which the skid control cycle enters into a HOLD mode cycle period to place the pressure control valve unit 16 at the HOLD mode position to maintain the increased level of braking pressure constant;

(4) by holding the increase level of braking pressure in the HOLD mode position of the pressure control valve unit 16, the wheel is decelerated to increase wheel slippage across a predetermined wheel slippage threshold, the control unit 22 is responsive to increasing of the wheel slippage increasing across the wheel slippage threshold to terminate the HOLD mode cycle period and trigger a RELEASE mode cycle period, in which the pressure control valve unit 16 is placed in the RELEASE mode position to decrease braking pressure in the wheel cylinder 10;

(5) maintaining the pressure control valve unit 16 in the RELEASE mode position, braking pressure is reduced and thus the wheel is accelerated to result in increasing of wheel acceleration $+\alpha$ across a predetermined wheel acceleration threshold $+\alpha_{ref}$, the control unit 22 is responsive to increasing of the wheel acceleration $+\alpha$ across the wheel acceleration threshold $+\alpha_{ref}$ to terminate the RELEASE mode cycle period and to trigger a HOLD mode cycle period to switch the position of the pressure control valve unit 16 from the RELEASE mode position to the HOLD mode position in order to hold the braking pressure at the lowered level;

(6) by maintaining the pressure control valve unit 16 at the HOLD mode, wheel speed is resumed and increases toward the vehicle body speed and is subsequently returned to the speed corresponding to the vehicle body speed, the control unit 22 is responsive to the wheel speed once, increased across the vehicle body speed, and subsequently returns to the vehicle body speed to terminate the HOLD mode cycle period and trigger the APPLICATION mode cycle period; skid cycles (3) to (6) are repeated while anti-skid control is active.

The followings is a discussion of the practical process of anti-skid brake control operation performed by the preferred embodiment of the anti-skid brake control system set forth above.

The shown embodiment of the anti-skid brake control system is triggered in response to turning ON of the ignition switch to initiate power supply. Then, wheel speed sensors 12FL, 12FR, 12RL, 12RR start monitoring of rotation speed of respectively corresponding wheels 9FL, 9FR, 9RL and 9RR. The wheel speed sensors 12FL, 12FR, 12RL and 12RR thus continuously produce the wheel speed indicative signals $v_1$, $v_2$, $v_3$ and $v_4$. The alternating current form wheel speed indicative signals $v_1$, $v_2$, $v_3$ and $v_4$ are cyclically or peridically converted into digital wheel speed indicative data $Vw_1$, $Vw_2$, $Vw_3$ and $Vw_4$ to be input to the micprocessor 22. Simultaneously, the wheel speed indicative voltage signals $Vw_1$, $Vw_2$, $Vw_3$ and $Vw_4$ are fed to the wheel speed filters 24FL, 24FR, 24RL and 24RR. The wheel speed filters 24FL, 24FR, 24RL and 24RR derive wheel speed variation data with a predetermined period, e.g. 5 msec, to compare with the acceleration limit value $k_2$, e.g. a change of 0.8 km/h and a deceleration limit value $-K_1$, e.g. a change of $-1$ km/h. When the wheel speed variation data is smaller than the deceleration limit value $-k_1$ or greater than the acceleration limit $k_2$, the instantaneous wheel speed indicative voltage signal level is modified to maintain the variation within the given range defined by the acceleration limit value $k_2$ and the deceleration limit value $-k_1$. The wheel speed filters 24FL, 24FR, 24RL and 24RR thus produce the limited wheel speed indicative signals $Vw_1'$, $Vw_2'$, $Vw_3'$ and $Vw_4'$. On the other hand, when the difference is maintained within the given range, the wheel speed indicative voltage signals $Vw_1$, $Vw_2$, $Vw_3$ and $Vw_4$ are output as the limited wheel speed indicative signals $Vw_1'$, $Vw_2'$, $Vw_3'$ and $Vw_4'$. The select-HIGH switch 25 selects the greatest wheel speed indicative signal among the four limited wheel speed indicative signals $Vw_1'$, $Vw_2'$, $Vw_3'$ and $Vw_4'$ as the maximum wheel speed indicative data $Vw_{max}$.

On the other hand, the longitudinal acceleration indicative signal Gx of the longitudinal acceleration sensor 13 is converted into an absolute value signal $|Gx|$ in the absolute value circuit 29 and summed with the offset value A of the offset value generator circuit 27 at the summing junction 28. The longitudinal acceleration indicative signal containing the offset value is thus input to the integrator circuit 26. The integrator circuit 26 is periodically or cyclically reset by the HIGH level reset signal. Therefore, as long as the reset signal RST is held HIGH level, the initial vehicle body speed representative value $V_{ref}$ is cyclically or periodically reset to update the stored initial value with the maximum wheel speed indicative value $Vw_{max}$.

Figure 3:
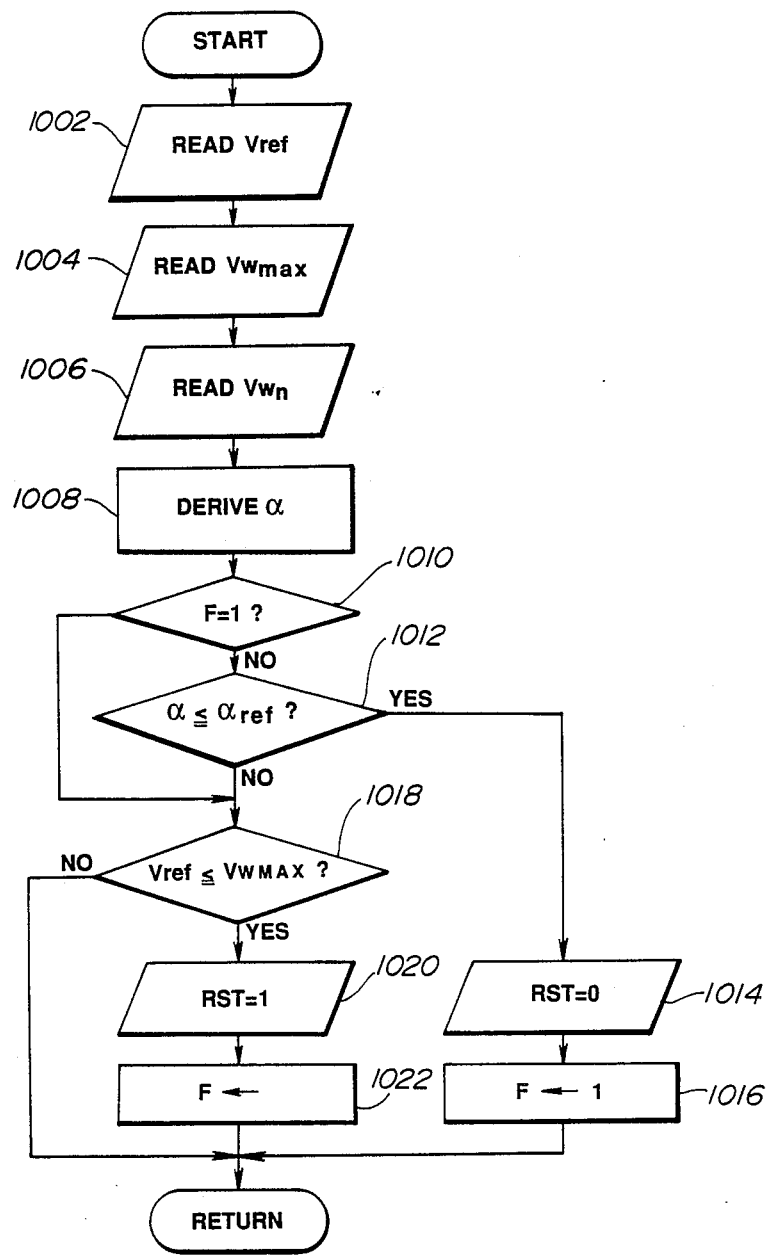
FIG. 3 is a flowchart of a routine for selecting an arithmetic operation mode for deriving a vehicle body speed representative data.
Figure 4:
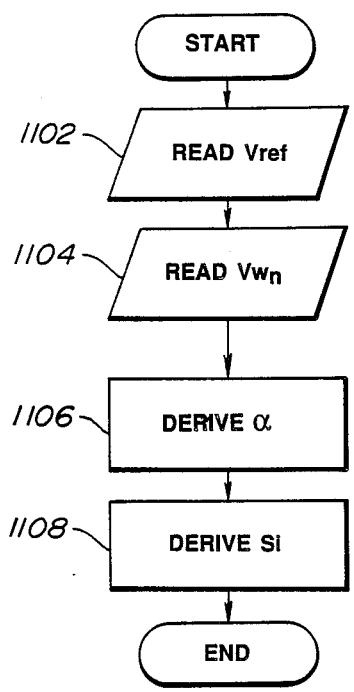
FIG. 4 is a flowchart of a routine for deriving a wheel acceleration and a wheel slippage.
Figure 5:
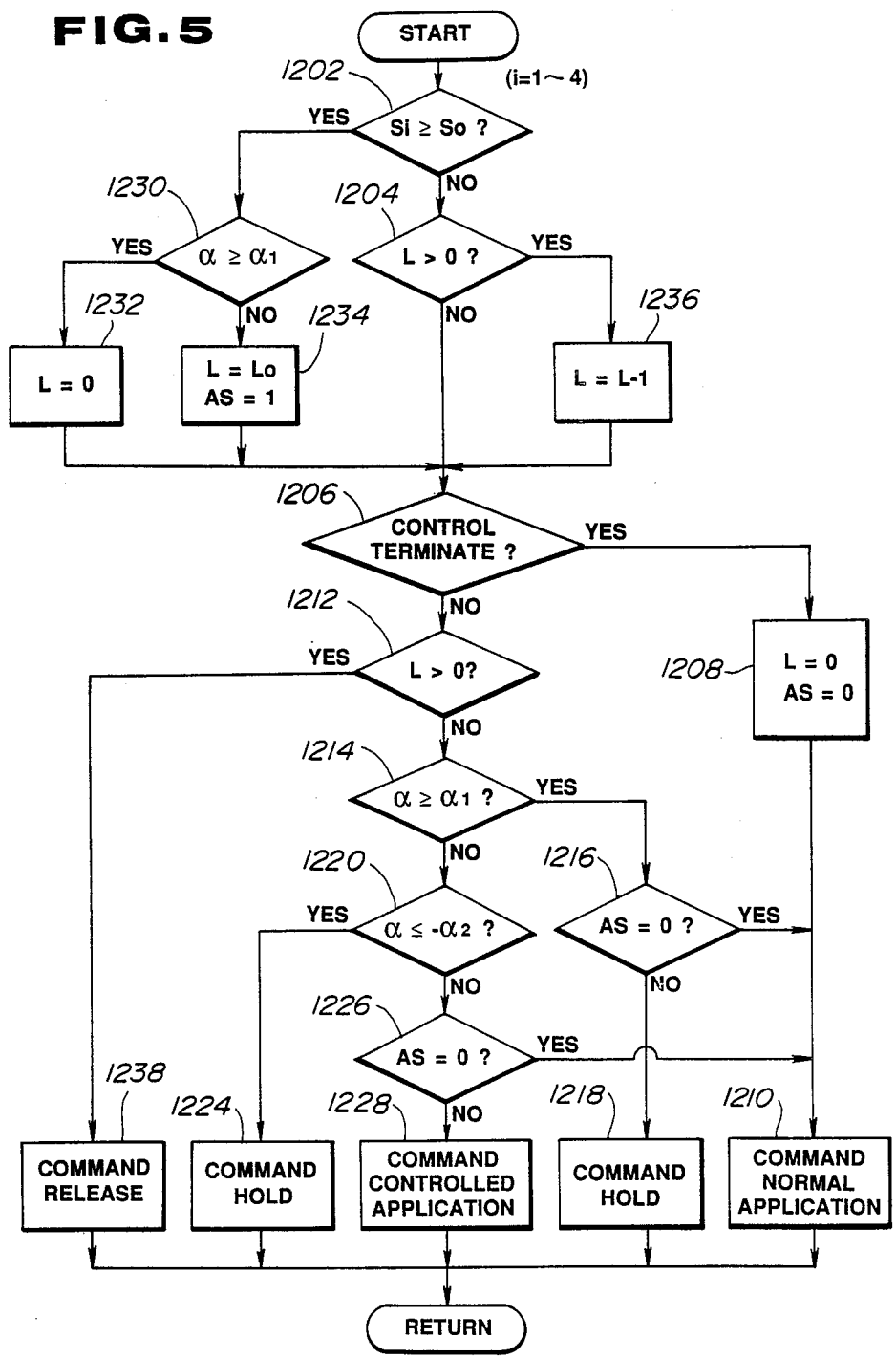
FIG. 5 is a flowchart of a routine for deriving an operation mode of anti-skid control.

The routines shown in FIGS. 3 to 5 are triggered every predetermined timing, e.g. every 20 msec while the vehicular braking state is maintained. It should be noted that the routines shown in FIGS. 3 to 5 are executed with respect to each wheel independently of each other. The routines for respective wheels may be executed every four cycles of execution cycles. In the alternative, respective execution cycles of the routines for respective wheels may be performed at different phases so as to enable independent brake control at an equal interval, e.g. 20 msec.

In the process illustrated in FIG. 3, at a step 1002 performed immediately after starting execution, the vehicle body speed representative data $V_{ref}$ is read out and temporarily stored in a temporary register in the memory unit 34. Then, the maximum wheel speed indicative data $Vw_{max}$ is read out at a step 1004 and temporarily stored in the temporary register. Similarly, at a step 1006, the wheel speed indicative data $Vw_n$ (n=1, 2, 3, 4) is read. The wheel speed indicative data $Vw_n$ read out is stored in the temporary register.

At a step 1008, a wheel acceleration $\alpha$ is calculated on the basis of the instantaneous wheel speed indicative data with precedingly read wheel speed data. It is of course possible to derive the wheel acceleration on the basis of the wheel speed difference between the instantaneous wheel speed indicative data value and the wheel speed indicative data value read at the immediately preceding execution cycle, and a known execution interval. However, it is also possible to derive the wheel acceleration in a more precise manner as disclosed in the foregoing United States Patents Nos.

U.S. Pat. No. 4,392,202, issued on July 5, 1983

U.S. Pat. No. 4,384,330, issued on May 23, 1984

Furthermore, it is also possible to derive the wheel acceleration by differentiating the wheel speed indicative data as disclosed in the United States Patent listed herebelow.

U.S. Pat. No. 4,430,714, issued on Feb. 7, 1984

All of the above-identified United States Patents are owned by the common assignee to the present invention. The disclosure of these United States Patents are herein incorporated by reference disclosure.

At a step 1010, a skid cycle indicative flag Fl is checked to determine whether it is set or not. The skid cycle indicative flag Fl indicates the state of derivation of a vehicle speed representative data $V_{ref}$. Namely, the skid cycle indicative flag Fl is set when the vehicle speed representative data $V_{ref}$ is derived utilizing the integrated value of the longitudinal acceleration indicative data ($|Gx| + A$). When the skid cycle indicative flag Fl is not set as checked at the step 1010, the wheel acceleration $\alpha$ is compared with the deceleration threshold $-\alpha_{ref}$ at a step 1012. If the wheel acceleration is smaller than or equal to the deceleration threshold $-\alpha_{ref}$, in other words the wheel deceleration is greater than the deceleration threshold, as checked at the step 1012, then the LOW level reset signal RST is output at a step 1014 to the integration circuit 26. By the LOW level reset signal RST, the integration circuit 26 is enabled to sum the latched maximum wheel speed indicative data $Vw_{max}$ with the integrated value of the longitudinal acceleration indicative data ($|Gx| + A$). Thereafter, the skid cycle indicative flag Fl is set at a step 1016.

On the other hand, when the wheel acceleration $\alpha$ is greater than the deceleration threshold $-\alpha_{ref}$ as checked at the step 1012, the vehicle body speed indicative data $V_{ref}$ is compared with the maximum wheel speed indicative data $Vw_{max}$ at a step 1018. If the vehicle body speed representative data $V_{ref}$ is smaller than or equal to the maximum wheel speed indicative data $Vw_{ref}$ as checked at the step 1018, then the HIGH level reset signal RST is output at the step 1020 for resetting the stored value in the integration circuit 26 and for latching the instantaneous maximum wheel speed indicative data $Vw_{max}$. Thereafter, the skid cycle indicative flag Fl is reset at a step 1022.

On the other hand, when the skid cycle indicative flag Fl is set as checked at the step 1010, then the process jumps the step 1012 and directly goes to the step 1018. Also, when the vehicle body speed representative data $V_{ref}$ is greater than the maximum wheel speed indicative data $Vw_{max}$ as checked at the step 1018, then the process directly goes to END.

FIG. 4 illustrates another routine for deriving the wheel acceleration $\alpha$ and the wheel slippage Si. The shown routine is also executed at a given interval, e.g. 20 msec. In the shown routine, the vehicle body speed representative data $V_{ref}$ is read out at a step 1102. At a step 1104, the instantaneous wheel speed indicative data $Vw_n$ is read out. The read vehicle body representative data $V_{ref}$ and the instantaneous wheel speed indicative data $Vw_n$ are temporarily stored in the temporary register.

At a step 1106, the wheel acceleration $\alpha$ is derived on the basis of the wheel speed indicative data $Vw_n$. Then, wheel slippage Si is calculated by the following equation:

$$Si = \{(V_{ref} - Vw_n)/V_{ref}\} \times 100\ (\%)$$

at a step 1108. After deriving the wheel slippage Si, the process returns to the background job.

FIG. 5 shows a skid cycle control routine for controlling the skid control cycle generally according to the schedule set forth in the general discussion of the process of anti-skid brake control. The skid cycle control routine of FIG. 5 will be discussed herebelow with additionally reference to FIGS. 6 and 7. It should be noted that in the timing chart of FIG. 6, the lines showing the wheel speed $Vw_n$, the maximum wheel speed $Vw_{max}$, and the vehicle body speed $V_{ref}$ are illustrated in a phase shifted manner so as to show respective speed variation clearly.

Figure 7:
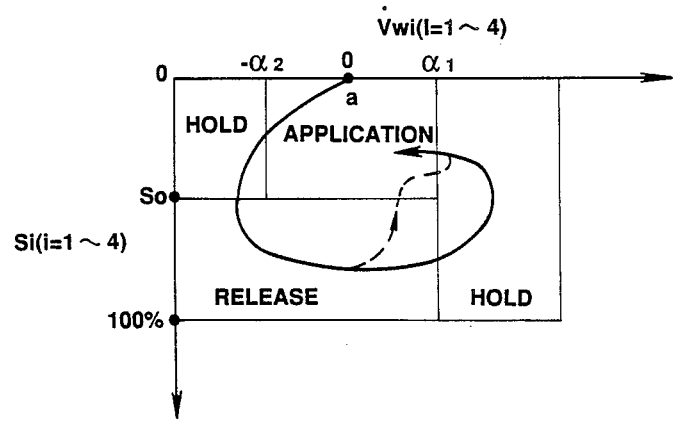
FIG. 7 is an illustration showing a schedule of a skid control cycle in anti-skid control.

It is assumed that the vehicle is traveling steadily before braking operation and anti-skid control is not active. Unless the brake is applied, wheel slippage Si is generally maintained zero. Therefore, in the skid cycle control schedule as shown in FIG. 7, the entering point to enter the vehicle braking state is a. At this condition, the routine of FIG. 5 is triggered to be periodically executed in response to depression of the brake pedal.

Immediately after starting execution, the wheel slippage Si is compared with a predetermined wheel slippage threshold $S_O$ at a step 1202. The wheel slippage threshold $S_O$ may be set at about the optimum wheel slippage range where an optimum vehicle braking efficiency can be obtained. In the shown embodiment, the wheel slippage threshold $S_O$ is set at 15%.

As seen from the timing chart in FIG. 6, the shown embodiment performs APPLICATION mode operation in mutually different two way modes. As shown in the period $t_0$ and $t_1$, the braking pressure increases linearly according to increasing of the fluid pressure built up in the master cylinder 8. Such an operational mode will be hereafter referred to as "NORMAL APPLICATION mode". In the other operational mode as illustrated in the period $t_1'$ to $t_2$, $t_2'$ to $t_3$, $t_3'$ to $t_4$, $t_4'$ ... in FIG. 6, the pressure control valve 16 is operated alternatively to the APPLICATION mode position and HOLD mode position for increasing the braking pressure in stepwise fashion. This operation mode will be hereafter referred to as "CONTROLLED APPLICATION mode". The CONTROLLED APPLICATION mode is introduced in order to lower the increasing of the braking pressure in the wheel cylinder so that the braking pressure is held at a level close to a pressure where the optimum wheel slippage is obtained and is hereafter referred to as "lock pressure", for an expanded period.

At the initial stage of the braking operation, wheel slippage Si is held smaller than wheel slippage threshold $S_O$. Therefore, the answer at the step 1202 at the initial braking state becomes negative. Then, at a step 1204, a check is performed whether a RELEASE mode timer value L of a RELEASE mode timer (not shown explicitly but facilitated in the arithmetic circuit 34 of the microprocessor 22) is greater than zero or not. At this time, the RELEASE mode timer value L is maintained at zero, the answer at the step 1204 also becomes negative. Then, at a step 1206, judgement is made that the condition satisfies a predetermined skid control terminating condition.

In the practical embodiment, the skid control terminating conditions are set as follows:
 when the vehicle body speed indicative data $V_{ref}$ is smaller than or equal to a vehicle body stopping state indicative reference value $V_{ref0}$;
 when the number of occurrences of switching of the pressure control valve position in the CONTROLLED APPLICATION mode becomes greater than or equal to a predetermined value $N_O$; and
 when the brake switch is turned OFF.

When the skid control terminating condition is satisfied as checked at the step 1206, the RELEASE mode timer value L is cleared and a skid control state indicative period flag AS is reset at a step 1208. At a step 1210, thereafter, the process goes to END.

If the skid control terminating condition as checked at the step 1206 is not satisfied, the RELEASE mode timer value L is again checked at a step 1212. When the RELEASE mode timer value L is smaller than or equal to zero as checked at the step 212, the wheel acceleration $\alpha$ is compared with a predetermined acceleration threshold $+\alpha_1$ at a step 1214. If the acceleration as checked at the step 1214 is greater than or equal to the wheel acceleration threshold $+\alpha_1$, it means that the wheel is not yet decelerated after initiation of increasing of the braking pressure or the wheel is in acceleration during a RELEASE mode cycle period. Therefore, in order to discriminate the instantaneous status of the braking condition, a check is performed whether the skid control state indicative flag AS is set at a step 1216. When the skid control state indicative flag AS is not set as checked at a step 1216, then the process goes to the process through the step 1210 for setting the operation mode to the NORMAL APPLICATION mode.

On the other hand, when the skid control state indicative flag AS is set as checked at the step 1216, then judgement is made that it is the time to switch the skid control cycle from the RELEASE mode cycle period to the HOLD mode cycle period because the wheel acceleration $\alpha$ is held greater than the wheel acceleration threshold $+\alpha_1$ and the operational mode is held in the RELEASE mode. Then, a HOLD mode cycle period is commanded at a step 1218. After commanding the HOLD mode cycle period, the process goes to END.

On the other hand, when the wheel acceleration $\alpha$ as compared with the wheel acceleration threshold $+\alpha_1$ at the step 1214, is smaller than the acceleration threshold $+\alpha_1$, then the wheel acceleration $\alpha$ is checked with a predetermined wheel deceleration threshold $-\alpha_2$ at a step 1220. When the wheel acceleration $\alpha$ as checked at the step 1220 is smaller than the wheel deceleration threshold $-\alpha_2$, it means that the braking condition requires anti-skid control. Then, at a step 1222, the HOLD mode cycle period is commanded for placing the pressure control valve 16 at the HOLD mode position, at a step 1224.

If the wheel acceleration $\alpha$ as compared with the wheel deceleration threshold $-\alpha_2$ at the step 1220 is greater than the wheel deceleration threshold, the skid control state indicative flag AS is checked at a step 1226. If the skid control mode indicative flag AS is not set as checked at the step 1226, the process goes to the step 1208. On the other hand, when the skid control state indicative flag AS is not set as checked at the step 1226, the CONTROLLED APPLICATION mode cycle period is commanded at a step 1226.

On the other hand, when wheel slippage Si as checked at the step 1202 is greater than or equal to the wheel slippage threshold $S_O$, then the wheel acceleration $\alpha$ is compared with the wheel acceleration threshold $+\alpha_1$ at a step 1230. When the wheel acceleration $\alpha$ as checked at the step 1230 is greater than or equal to the wheel acceleration threshold $+\alpha_1$, judgement can be made that the condition to perform the RELEASE mode skid control cycle per operation is not satisfied. Therefore, the RELEASE mode timer value L is cleared at a step 1232. On the other hand, when the wheel acceleration $\alpha$ as checked at the step 1230 is smaller than the wheel acceleration threshold $+\alpha_1$, judgement can be made that a condition for performing the RELEASE mode skid control mode cycle period is satisfied. Therefore, at a step 1234, the RELEASE mode timer value L is set at a predetermined initial timer value $L_0$ which represents a period to maintain a RELEASE mode skid control cycle period after the wheel slippage Si is decreased across the wheel slippage threshold $S_O$. At the same time, the skid control state indicative flag AS is set.

When the RELEASE mode timer value L as checked at the step 1204 is greater than zero (0), then, the RE- LEASE mode timer value L is decremented by one (1) at a step 1236 and thereafter the process moves to the step 1206. When the RELEASE mode timer value L as decremented at the step 1236 is still held greater than zero (0), the answer at the step 1212 becomes positive since the RELEASE mode timer value is greater than zero. Then, the process goes to a step 1238.

The example of practical operation of anti-skid control performed through the routine of FIG. 5 will be discussed herebelow with reference to FIGS. 6 and 7.

At the initial stage of braking operation starting at the time $t_O$, the wheel acceleration $\alpha$ is decreased across the wheel deceleration threshold $\alpha_{ref}$ to switch the reset signal level from HIGH level to LOW level. This results in introduction of the longitudinal acceleration data $|Gx + A|$ for deriving the vehicle body speed representative data $V_{ref}$ by $$V_{ref} = Vw_{max} + \int(|Gx| + A)\, dt$$

through the steps 1012 to 1016. The wheel slippage Si is held smaller than the wheel slippage threshold $S_O$. Therefore, the answer in the step 1202 is held negative. At this time, since the anti-skid control is not yet initiated, the RELEASE mode timer value L is maintained zero (0). Therefore, the answer at the step 1204 also becomes negative. Since the brake is applied, the answer in the step 1206 is negative to indicate that the condition for satisfying termination of the anti-skid control is not established.

Until wheel acceleration $\alpha$ smaller than the wheel deceleration threshold $-\alpha_2$ is detected at the step 1220, the NORMAL APPLICATION mode is repeatedly commanded at the step 1210 for increasing the braking pressure in linear fashion as illustrated in the period $t_0$ to $t_1$. Therefore, at the initial stage of braking operation, the NORMAL APPLICATION mode skid cycle is performed for a period a as indicated in FIG. 6. At a time $t_1$, the wheel acceleration $\alpha$ decreases across the wheel deceleration threshold $-\alpha_2$, therefore, the answer in the step 1220 turns positive. As a result, the HOLD mode skid control cycle period is commanded at the step 1224. Therefore, the anti-skid control system becomes active for performing anti-skid brake control operation. The HOLD mode skid control cycle period is maintained with a period b until the wheel slippage Si is increased across the wheel slippage threshold $S_0$.

When the wheel slippage Si becomes greater than or equal to the wheel slippage threshold $S_0$, the answer in the step 1202 becomes positive. At the initial stage of the RELEASE mode skid control cycle period, the wheel acceleration $\alpha$ is maintained smaller than the wheel acceleration threshold $+\alpha_2$. Therefore, the answer in the step 1230 becomes negative. This causes setting of the RELEASE mode timer value L to the initial value $L_O$ and setting of the skid control state indicative flag AS, at the step 1234. By setting the RELEASE mode timer value L to $L_O$, the answer in the step 1212 becomes positive to command a RELEASE mode skid control cycle period at the step 1238.

By decreasing the braking pressure in the RELEASE mode skid control cycle period, the wheel speed is resumed to decrease wheel slippage Si across the wheel slippage threshold $S_O$. This results in a negative answer in the step 1202. As long as the RELEASE mode timer value L is held greater than zero (0), the answer in the step 1204 is held positive and is decreased by one (1) every occurrence of execution of the routine of FIG. 5. As long as the RELEASE mode timer value L is maintained greater than zero (0), the RELEASE mode skid control cycle period is repeatedly commanded for maintaining the pressure control valve 16 at the RELEASE mode position, as illustrated by the period c in FIG. 6.

When the RELEASE mode timer value L is decreased to zero at the step 1236 or, in the alternative, when the wheel acceleration $\alpha$ becomes greater than or equal to the wheel acceleration threshold $+\alpha_1$ to turn the answer in the step 1230 into positive to cause clearing the RELEASE mode timer value L to zero at the step 1232, the answer in the step 1212 becomes negative. At this time, since the wheel acceleration $\alpha$ is greater than or equal to the wheel acceleration threshold $+\alpha_1$ and the skid control state indicative flag AS is set, the HOLD mode skid control cycle period is commanded at the step 1218.

During the HOLD mode skid control cycle period, wheel speed $Vw_n$ is continued to increase such that the maximum wheel speed indicative data $Vw_{max}$ becomes greater than or equal to the vehicle body speed representative data $V_{ref}$ at a time $t_1'$. This causes the positive answer at the step 1018. Therefore, the reset signal RST is turned into the HIGH level at the step 1020, and the skid cycle indicative flag F1 is reset at the step 1022 of the routine of FIG. 3. Since the reset siqnal RST is maintained at the LOW level and the skid cycle cycle indicative flag F1 is held in the reset state until the wheel acceleration $\alpha$ is again decreased to the wheel deceleration threshold $\alpha_{ref}$ at a time $t_2$, the vehicle body speed representative data $V_{ref}$ is derived at a corresponding value to the maximum wheel speed indicative data $Vw_{max}$. The period in which the vehicle body speed representative data $V_{ref}$ is derived to the value corresponding to the maximum wheel speed indicative data $Vw_{max}$ is illustrated as a period a' in the timing chart of FIG. 6.

By maintaining the skid control cycle at the HOLD mode skid control cycle period as set forth, the wheel acceleration $\alpha$ is decreased across the wheel acceleration threshold $+\alpha_1$. Then, the CONTROLLED APPLICATION mode skid control cycle period is commanded at the step 1228 since the skid control state indicative flag AS is held in the set position.

Through the process as set forth above, precise brake control becomes possible. Furthermore, according to the present invention, since the longitudinal acceleration indicative data is provided with the predetermined offset value for increasing the deceleration at given level, avoidance of no braking state can be assured.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An anti-skid brake control system comprising:
   a hydraulic circuit connecting a hydraulic pressure source to a wheel cylinder generating a braking pressure therein,
   a pressure control valve disposed in said hydraulic circuit, operating to increase said braking pressure in said wheel cylinder in a first mode and to decrease said braking pressure in said wheel cylinder in a second mode;

a first sensor monitoring a rotation speed of a vehicular wheel with which said wheel cylinder is associated to produce a wheel speed indicative signal;

a second sensor monitoring a longitudinal acceleration exerted on a vehicle body and producing a longitudinal acceleration indicative signal;

a first arithmetic means for generating a predetermined offset value to alter said longitudinal acceleration indicative signal, for integrating said altered longitudinal acceleration indicative signal for deriving a wheel speed magnitude indicative data, and for summing said wheel speed magnitude indicative data and an initial value which corresponds to a wheel speed indicative signal value at a beginning of each skid control cycle for deriving a vehicle body speed representative data; and a second arithmetic means for controlling said pressure control valve in said first mode for placing said pressure control valve in a first position and in said second mode for placing said pressure control valve in a second position, said second arithmetic means deriving a control signal for selecting said first and second mode on the basis of said wheel speed indicative signal and said vehicle body speed representative data so as to maintain a wheel slippage within a predetermined range.

2. An anti-skid brake control system as set forth in claim 1, wherein said first arithmetic means operates in a normal arithmetic mode for deriving said vehicle body speed representative data using a value corresponding to said wheel speed indicative signal value and a skid control state arithmetic mode for deriving said vehicle body speed on the basis of said initial value and said integrated value of said altered longitudinal acceleration indicative signal in said skid cycle.

3. An anti-skid brake control system as set forth in claim 2, wherein said first arithmetic means derives a wheel acceleration and compares said wheel acceleration with a predetermined threshold value so as to select said normal arithmetic mode when said wheel acceleration is maintained greater than or equal to said threshold value and to select said skid control state arithmetic mode otherwise.

4. An anti-skid brake control system as set forth in claim 3, wherein said first arithmetic means further compares said vehicle body speed representative data and said wheel speed indicative signal so as to permit said normal arithmetic mode operation when said wheel speed indicative signal is greater than or equal to said vehicle body speed representative data.

5. An anti-skid brake control system comprising:

a hydraulic circuit connecting a hydraulic pressure source to first and second wheel cylinders generating braking pressures for decelerating first and second vehicular wheels, respectively;

first and second pressure control valves disposed in said hydraulic circuit controlling braking pressure generated in respectively associated first and second wheel cylinders, each of said first and second pressure control valves operating to increase said braking pressure in said associated wheel cylinder in a first mode and to decrease said braking pressure in said associated wheel cylinder in a second mode;

a first sensor monitoring a rotation speed of said first vehicular wheel with which said first wheel cylinder is associated to produce a first wheel speed indicative signal;

a second sensor monitoring a rotation speed of said second vehicular wheel with which said second wheel cylinder is associated to produce a second wheel speed indicative signal;

a third sensor monitoring a longitudinal acceleration exerted on a vehicle body and producing a longitudinal acceleration indicative signal;

a first arithmetic means for generating a predetermined offset value to alter said longitudinal acceleration indicative signal, for integrating said altered longitudinal acceleration indicative signal for deriving a wheel speed magnitude indicative data, and for summing said wheel speed magnitude indicative data and an initial value which corresponds to a greater one of said first and second wheel speed indicative signals at a beginning of each skid control cycle for deriving a vehicle body speed representative data; and a second arithmetic means for controlling said pressure control values in said first mode for placing said pressure control values in a first position and in said second mode for placing said pressure control valves in a second position, said second arithmetic means deriving a control signal for selecting said first and second mode on the basis of said wheel speed indicative signal and said vehicle body speed representative data so as to maintain a wheel slippage within a predetermined range.

6. An anti-skid brake control system as set forth in claim 5, wherein said first arithmetic means operates in a normal arithmetic mode for deriving said vehicle body speed representative data a value corresponding to said greater one of said first and second wheel speed indicative signals and a skid control state arithmetic mode for deriving said vehicle body speed on the basis of said initial value and said integrated value of said altered longitudinal acceleration indicative signal in said skid cycle.

7. An anti-skid brake control system as set forth in claim 6, wherein said first arithmetic means derives a wheel acceleration and compares said wheel acceleration with a predetermined threshold value so as to select said normal arithmetic mode when said wheel acceleration is maintained greater than or equal to said threshold value and to select said skid control state arithmetic mode otherwise.

8. An anti-skid brake control system as set forth in claim 7, wherein said first arithmetic means further compares said vehicle body speed representative data and one of said first, second and third wheel speed indicative signals so as to permit said normal arithmetic mode operation when one of said first, second and third wheel speed indicative signals is greater than or equal to said vehicle body speed representative data.

9. An anti-skid brake control system comprising:

a hydraulic circuit connecting a hydraulic pressure source to at least first, second, and third wheel cylinders generating braking pressures for decelerating first, second and third vehicular wheels, respectively;

at least first, second and third pressure control valves disposed in said hydraulic circuit controlling braking pressures generated in respectively associated first, second and third wheel cylinders, each of said first, second and third pressure control valves operating to increase said braking pressure in an associated one of said first, second and third wheel cylinders in a first mode, to decrease said braking pressure in said associated wheel cylinder in a second mode and to hold braking pressure in said associated wheel cylinder at a constant value in a third mode;

a first sensor monitoring a rotation speed of said first vehicular wheel with which said first wheel cylinder is associated to produce a first wheel speed indicative signal;

a second sensor monitoring a rotation speed of said second vehicular wheel with which said second wheel cylinder is associated to produce a second wheel speed indicative signal;

a third sensor monitoring a rotation speed of said third vehicular wheel with which said third wheel cylinder is associated to produce a third wheel speed indicative signal;

a fourth sensor monitoring a longitudinal acceleration exerted on a vehicle body and producing a longitudinal acceleration indicative signal;

a first arithmetic means for generating a predetermined offset value to alter said longitudinal acceleration indicative signal, for integrating said altered longitudinal acceleration indicative signal for deriving a wheel speed magnitude indicative data, and for summing said wheel speed magnitude indicative data and an initial value which corresponds to the one of said first, second and third wheel speed indicative signals having a greatest value at a beginning of each skid control cycle for deriving a vehicle body speed representative data; and a second arithmetic means for controlling said pressure control valves in said first mode for placing said pressure control valves in a first position, in said second mode for placing said pressure control valves in a second position, and in said third mode for placing said pressure control valves in a third position, said second arithmetic means deriving a control signal for selecting said first and second modes on the basis of said wheel speed indicative signal and said vehicle body speed representative data so as to maintain a wheel slippage within a predetermined range.

10. An anti-skid brake control system as set forth in claim 9, wherein said first arithmetic means operates in a normal arithmetic mode for deriving said vehicle body speed representative data using a value corresponding to said one of said first, second and third wheel speed indicative signals having the greatest value and a skid control state arithmetic mode for deriving said vehicle body speed on the basis of said initial value and said integrated value of said altered longitudinal acceleration indicative signal in said skid cycle.

11. An anti-skid brake control system as set forth in claim 10, wherein said first arithmetic means derives a wheel acceleration and compares said wheel acceleration with a predetermined threshold value so as to select said normal arithmetic mode when said wheel acceleration is maintained greater than or equal to said threshold value and to select said skid control state arithmetic mode otherwise.

12. An anti-skid brake control system as set forth in claim 11, wherein said first arithmetic means further compares said vehicle body speed representative data and one of said first, second and third wheel speed indicative signals so as to permit said normal arithmetic mode operation when one of said first, second and third wheel speed indicative signals is greater than or equal to said vehicle body speed representative data.

13. An anti-skid brake control system as set forth in claim 9, wherein said second arithmetic means derives a wheel acceleration with respect to each of said first, second and third wheel speed indicative signals and a wheel slippage on the basis of said vehicle body speed representative data and each of said first, second and third wheel speed indicative signals, said second arithmetic means derives an anti-skid control signal for each of first, second and third pressure control valves for operating said pressure control valves in one of said first, second and third modes, said second arithmetic means deriving said anti-skid brake control signal to order said third mode in response to said wheel acceleration smaller than or equal to a predetermined deceleration threshold, to order said second mode in response to said wheel slippage greater than or equal to a predetermined wheel slippage threshold, to order said third mode when said wheel acceleration is greater than or equal to a predetermined acceleration threshold, and to order said first mode when said wheel slippage is smaller than said wheel slippage threshold and said wheel acceleration is smaller than said wheel acceleration threshold and greater than said wheel deceleration threshold.

14. An anti-skid brake control system as set forth in claim 9, wherein;

said second arithmetic means derives a wheel acceleration with respect to each of said first, second and third wheel speed indicative signals and a wheel slippage on the basis of said vehicle body speed representative data and each of said first, second and third wheel speed indicative signals, said second arithmetic means derives an anti-skid control signal for each of said first, second and third modes for operating said pressure control valves in a corresponding one of said first, second and third positions, said second arithmetic means derives said anti-skid brake control signal to order said third mode in response to decreasing of said wheel acceleration across a predetermined deceleration threshold, to order said second mode in response to increasing of said wheel slippage across a predetermined wheel slippage threshold, to order said third mode in response to increasing of said wheel acceleration across a predetermined acceleration threshold, and to order said first mode in response to decreasing of said wheel slippage across said vehicle body speed representative data.

* * * * *